United States Patent [19]

Rapp

[11] Patent Number: 5,749,613

[45] Date of Patent: May 12, 1998

[54] TOOL HANDLE EXTENSION

[76] Inventor: Doris R. Rapp, 2143 Fairview Ave., Mt. Penn, Pa. 19606-1809

[21] Appl. No.: 670,426

[22] Filed: Jun. 26, 1996

[51] Int. Cl.$^6$ .............................. B25G 1/04; B25G 3/02

[52] U.S. Cl. ..................... 294/58; 16/114 R; 16/115; 15/145

[58] Field of Search ................. 16/111 R, 114 R, 16/115, DIG. 24, 113; 294/57, 58; 15/145

[56] References Cited

U.S. PATENT DOCUMENTS

| | | |
|---|---|---|
| 1,278,100 | 9/1918 | Bruning. |
| 1,530,225 | 3/1925 | Belakoy. |
| 1,565,599 | 12/1925 | Stevens. |
| 2,536,607 | 1/1951 | Jenkins ..................... 16/114 R |
| 2,562,765 | 7/1951 | Brandt. |
| 2,565,466 | 8/1951 | Barker. |
| 3,336,617 | 8/1967 | Bosko et al.. |
| 3,773,375 | 11/1973 | Nehls ............................ 16/115 |
| 4,197,764 | 4/1980 | Auernhammer ............ 16/114 R |
| 4,198,090 | 4/1980 | Gutman ......................... 16/115 |
| 4,794,667 | 1/1989 | Nelson et al. ............. 16/114 R |
| 5,048,883 | 9/1991 | Waluk ............................ 294/58 |
| 5,165,144 | 11/1992 | Nisenbaum ............... 16/114 R |

FOREIGN PATENT DOCUMENTS 868232  2/1953  Germany.
809824  3/1959  United Kingdom.

Primary Examiner—Chuck Mah
Assistant Examiner—Donald M. Gurley
Attorney, Agent, or Firm—Richard C. Litman

[57] ABSTRACT

A tool handle extension is permanently or semi-permanently attachable to a tool having a straight, elongate handle, such as a snow pusher, push broom, or similar tool. The extension enables the user to extend the reach of the tool for clearing large areas having only limited access thereto, as in clearing snow from a roof area from an overlooking dormer window or the like. The extension is formed of standard, off the shelf components, with a cylindrical tube handle extension and crossmember forming a T configuration. Diagonal brace straps are provided between the ends of the crossmember and a lower point on the handle extension, for better lateral strength. Additional features, such as hand grips, end caps for the tubular members, sleeves to accommodate differences in internal tube diameter and tool handle diameter, and anti-crush plugs inserted into the tubes at various attach points, may be incorporated. Attachment of one tubular member to another is provided by forming an eye or passage through one of the members and inserting the other member therethrough. A larger diameter tube may be inserted through a smaller diameter tube, by expanding the eye of the smaller diameter as required. The present tool handle extension is particularly well adapted for compressive loads, as in pushing the tool, with the diagonal bracing providing strength for some lateral manipulation of the tool.

20 Claims, 4 Drawing Sheets

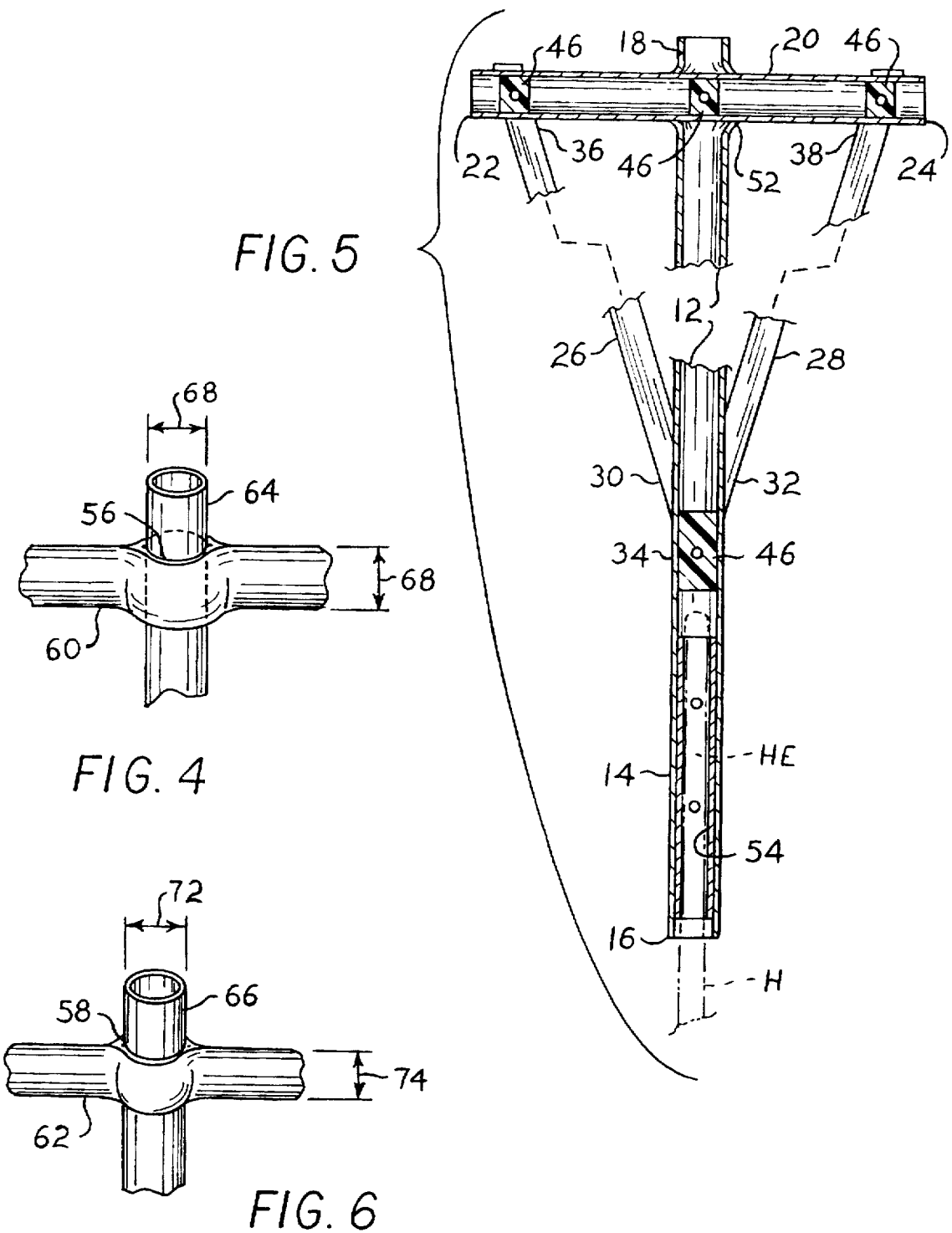

TOOL HANDLE EXTENSION

BACKGROUND OF THE INVENTION

1. Field of the Invention

The present invention relates generally to elongate handles for tools and implements, such as shovels, brooms, rakes, and the like, and more specifically to an extension therefor which may be secured to such a tool in order to extend the reach of the tool. The extension basically comprises a tubular member which is secured over the end of the elongate handle, with a tubular crossmember secured to the opposite end of the first member. Diagonal bracing is also provided between the crossmember and first member, for additional strength. The extension is especially well adapted for attachment to a push broom or snow pusher type shovel, in order to enable a user of the tool and extension to clear snow from a relatively large area of the roof of a structure, from an upper window or opening overlooking that portion of the roof.

2. Description of the Prior Art

Tools and implements having elongate handles, such as shovels, rakes, brooms, etc., are generally provided with a handle having a length adapted to provide optimum leverage for the average user. The resulting length, while providing for relatively easy manipulation of the tool, does limit the reach of the tool somewhat.

While various supplementary handles and extensions have been developed for many tools, most are adapted to provide greater leverage for the user, as in a shovel or other implement adapted to penetrate the ground and/or to lift a significant mass of earth or other material by manual effort, rather than to extend the reach of the tool. Normally, the conventional handle length provided with these tools is sufficient for the job at hand.

However, there are certain tasks where leverage is not so important and which require a relatively long handled tool, such as clearing or spreading material over a relatively large area from a single access point. Oftentimes, a shovel or broom-like implement is reasonably well suited for such a task, but the conventional handle supplied with such implements limits the reach considerably.

An example of the above is in the clearing of snow from the roof of a structure. While most building structures must meet certain standards for the support of snow loads, depending upon their location, extremely heavy snows may possibly overstress the roofs of some structures. Thus, rooftop snow removal can be an important task for many persons in more northern climes during the winter. Various snow shovels and snow pushers have been developed for the clearing of snow from sidewalks, driveways, etc., and push brooms may also be useful for such tasks, depending upon the type and depth of the snow and other factors. These tools all have conventional elongate pole type handles, generally on the order of some four to five feet long.

Such a handle length works well for a person working on the same level as the tool, but is limiting when the user is attempting to reach a different level or is attempting to clear a large area from a restricted access point, such as clearing a large section of a roof from a single overlooking window or dormer. Little leverage is required for such snow removal, but a relatively long handled tool is a necessity to provide the reach required in order to preclude need for the person to get a ladder to work from outside, and/or to endanger himself/herself by working from the roof. In many cases, even a relatively moderate extension length may be sufficient to accomplish the required snow removal, as sufficient snow may be cleared to reduce the snow load to an acceptable level.

Accordingly, a need arises for a handle extension for tools having elongate handles, such as snow shovels, push brooms and the like, which extension is secured to the tool to provide sufficient reach for the clearance of snow and/or other materials from areas otherwise remote to the user of the tool. The extension should preferably incorporate a T-shaped handle having a crossmember, to aid in the manipulation of the tool. Diagonal bracing between the crossmember and main portion of the handle extension is preferably also incorporated, to provide additional strength. The primary extension portion and crossmember may be formed of lightweight tubing, such as aluminum, for strength and light weight. Handgrips and/or end caps may be provided over the tubing, if desired. A discussion of the differences between the prior art known to the inventor, and the present invention, is provided below.

U.S. Pat. No. 1,278,100 issued on Sep. 10, 1918 to George Bruning describes an Adjustable Post Auger Handle which may be telescoped to adjust the length as desired. The present handle extension is fixed in length; no adjustment is provided. Bruning provides for the torsional forces applied in such a tool by forming the components of square section tubing, but does not consider any bracing for lateral forces, as such are normally not applied when using an auger. The present extension is adapted primarily for compressive forces along the handle, as in pushing the tool, with some consideration for lateral force provided by diagonal bracing between the lateral handle portion and the main stem portion. Bruning requires several specially formed components, such as the T-shaped collar for the crossmember handle and the upper stem component, whereas the present extension utilizes off the shelf components.

U.S. Pat. No. 1,530,225 issued on Mar. 17, 1925 to Steven Belakoy describes a Gardening Implement having a plug and socket connection for the handle to the implement working portion. The device requires relatively complex, specially formed components, unlike the present invention, and Belakoy does not disclose any handle extension means, but rather a means of attaching a single handle to a plurality of different implement working portions. No crossmember is disclosed by Belakoy, as provided by the present invention. The present extension is adapted for permanent or semipermanent installation to an existing conventional tool handle, whereas Belakoy provides for removable attachment.

U.S. Pat. No. 1,565,599 issued on Dec. 15, 1925 to William H. Stevens describes a Handle For Tools comprising a stamped sheet metal core of two mirrored halves, encased in a fiber and plastic resin matrix. The resulting handle is permanently attached to a tool handle end which has been modified to fit the handle. No handle extension is disclosed by Stevens. No off the shelf, pre-manufactured parts, other than fastening hardware, are used in the Stevens handle, whereas the present handle extension uses such components throughout. No modification of the existing conventional tool handle is required by the present extension, other than the forming of a few screw attachment holes therein.

U.S. Pat. No. 2,536,607 issued on Jan. 2, 1951 to Homer T. Jenkins describes a Broom Rake having an elongate, adjustably telescoping handle. The handle length may be locked by means of a set screw. Among other features, a crossmember handle is shown at the upper end of the elongate main handle portion, but the crossmember is relatively short and is slidably contained in a specially formed fitting to extend to either one side or the other thereof; it is not adapted to extend to both sides, as in the T-shaped handle configuration of the present extension. The Jenkins rake is actually a complete implement incorporating a number of different features, and none of the features is readily adaptable to another implement or tool, as in the present tool handle extension. The telescoping main handle portion requires specially formed cooperating components, unlike the present extension which is attachable to an existing conventional elongate tool handle.

U.S. Pat. No. 2,562,765 issued on Jul. 31, 1951 to Henry E. Brandt describes a Sheet Metal Handle forming a crossmember for an existing handle having a rod configuration. The formation of the crossmember requires special dies and other equipment beyond the tools and equipment required for the construction of the present handle invention. No extension is disclosed by Brandt, but only a crossmember which may be permanently secured to an existing elongate handle.

U.S. Pat. No. 2,565,466 issued on Aug. 28, 1951 to Frederick W. Barker describes a Knockdown Shovel having an elongate tubular handle portion with the working end and spade handle portions having sockets which are removably attachable to the handle portion by bayonet fittings. Bolts and wing nuts are used to secure the elements together. No extension for a permanently installed conventional handle is disclosed, nor is any tubular crossmember provided at the upper end of the elongate portion.

U.S. Pat. No. 3,336,617 issued on Aug. 22, 1967 to John M. Bosko et al. describes a Paint Brush Holder With Telescopic Handle Sections, having a formed hand grip coaxially disposed at one end thereof and a bidirectionally adjustable paint brush clamp at the opposite end. The present handle extension does not use a clamp to secure to the implement handle, but comprises a tube which passes over the handle to affix the handle and extension coaxially relative to one another. No handle extension crossmember, or bracing therefor, is disclosed by Bosko et al., as provided by the present invention.

U.S. Pat. No. 4,794,667 issued on Jan. 3, 1989 to Stanley E. Nelson et al. describes a Detachable Auxiliary Handle somewhat like a spade type handle, but removably and adjustably attachable to some intermediate point along an elongate handle shaft. The device does not extend the elongate handle, but rather provides a supplemental grip along the intermediate portion of the elongate handle of the tool. The Nelson et al. handle is thus more adapted to provide leverage for lifting or levering the tool, rather than to extend its reach to provide for pushing the working end a greater distance from the user, as in the present invention.

U.S. Pat. No. 5,165,144 issued on Nov. 24, 1992 to Philip Nisenbaum describes a Tool Handle And Angularly Adjustable Attachment, comprising a specially shaped tubular handle having a branching secondary handle extending therefrom. The device is not an extension of an existing elongate handle, but attaches directly to any one of a number of implement working ends. The device is adapted to provide ergonomic advantages in the lifting and lateral manipulating of the tool, rather than to provide an extension of the reach of the tool, as in the present invention. No handle crossmember, or bracing therefor, is disclosed by Nisenbaum.

British Patent Publication No. 809,824 published on Mar. 4, 1959 to Arthur S. Bullock describes Improvements Relating To Spades Or Like Implements, primarily directed to a lever attachment securable to the back of the blade. However, a handle extension is disclosed which secures to the top of the spade handle. The spade requires a tubular handle in order to accept the leaf spring attachment of the extension, unlike the tubular extension of the present invention which passes over the solid conventional handle of the tool. Moreover, the tubular tool handle must be cut away to form a channel, in order to enable the leaf spring extension attachment to flex relative to the axis of the tool handle; no such flexure is provided for or desired in the present extension. While Bullock discloses a crossmember at the upper end of his extension, no diagonal bracing therefor is disclosed, nor is any specific means of attaching the crossmember and main extension portions disclosed.

Finally, German Patent Publication No. 868,232 published on Feb. 23, 1953 illustrates a spade including various attachments providing ergonomic advantage therefor. While the structure of the device is somewhat different than that of the British patent publication discussed immediately above, the function is closely related. No handle extension as such is disclosed, but rather the handle is joined to the working implement portion by a pivotal attachment immediately thereabove. An upper handle crossmember is disclosed, which has the general configuration of a bicycle handlebar. No diagonal bracing is disclosed, however, and the means of attaching the crossmember to the main handle portion is unlike that of the present invention.

None of the above inventions and patents, taken either singly or in combination, is seen to describe the instant invention as claimed.

SUMMARY OF THE INVENTION

Accordingly, it is a principal object of the invention to provide an improved tool handle extension which is permanently or semi-permanently attachable to the elongate handle of an existing tool, such as a snow pusher, push broom, or other tool.

It is another object of the invention to provide an improved tool handle extension comprising a first tubular handle extension component and a second tubular crossmember affixed to the first member at the upper end thereof, to form a T-shaped configuration.

It is yet another object of the present invention to provide an improved tool handle extension which crossmember may pass through an eye formed in the handle extension, or which handle extension may pass through an eye formed in the crossmember, with the eyes and tubular members being formed and/or expanded as required to accommodate tubes of different diameters.

It is a further object of the invention to provide an improved tool handle extension which includes diagonal bracing straps extending from the distal ends of the crossmember to a lower point on the handle extension member.

An additional object of the invention is to provide an improved tool handle extension which may incorporate a sleeve between the tool handle and the inside diameter of the handle extension member, to accommodate any space which may exist between the two depending upon their relative diameters.

Still another object of the invention is to provide an improved tool handle extension utilizing stock components.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 4 is a detail perspective view showing the intersection of a handle extension tube and crossmember having equal diameters.

FIG. 5 is an elevation view in section of the present tool handle extension, showing internal details.

FIG. 6 is a broken away perspective view showing the intersection of an extension tube and crossmember wherein the tube having the eye formed therein is a smaller diameter than the tube passing therethrough.

Similar reference characters denote corresponding features consistently throughout the attached drawings.

DETAILED DESCRIPTION OF THE PREFERRED EMBODIMENTS

Figure 1:
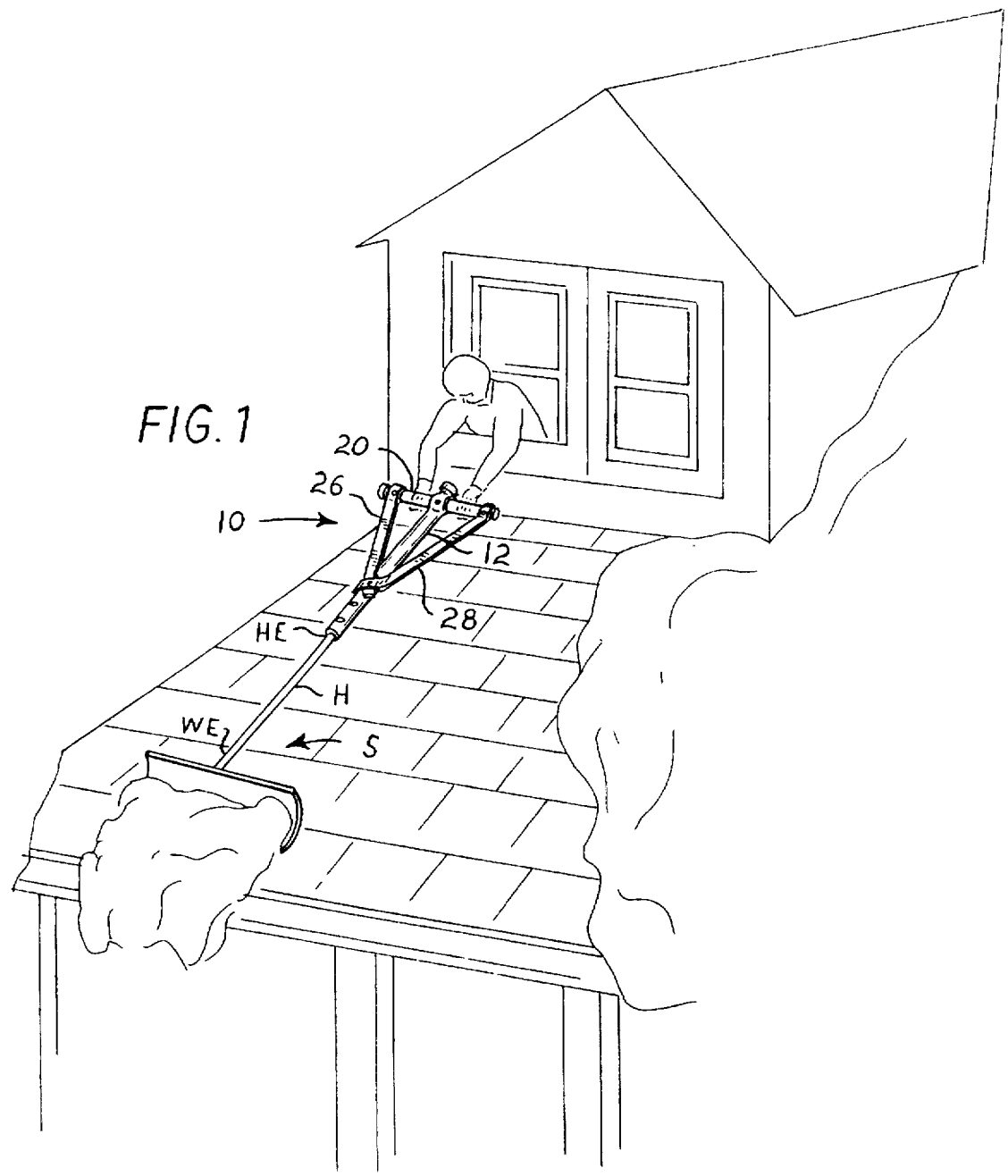
FIG. 1 is an environmental perspective view of the present tool handle extension in use with a snow pusher shovel type tool having an elongate handle.

The present invention comprises a tool handle extension 10, which may be permanently or semi-permanently affixed to the handling end HE of the handle H of a manual tool having a straight, elongate cylindrical handle extending from the implement attachment or working end WE, such as the snow pusher shovel S shown in FIG. 1. It will be seen that the present tool handle extension invention may be affixed to virtually any such manually operated tool having a straight elongate handle extending therefrom, such as a shovel, rake, broom, or other tool having a similar handle configuration. Details of the extension 10 are shown in FIG. 2.

The present tool handle extension 10 essentially comprises a straight, elongate, cylindrical tubular tool handle attachment member 12 having a tool handle attachment portion 14 and end 16, and an opposite handle end 18. The handle end 18 has a crossmember handle 20 secured normal thereto and coplanar therewith, with the crossmember handle 20 comprising a straight, elongate cylindrical tube having a first end 22 and an opposite second end 24. The tool handle attachment member 12 and crossmember handle 20 thus essentially form a T shaped configuration when they are assembled.

A first and an opposite second diagonal reinforcement strap 26 and 28, each have a respective first end 30/32 secured to a reinforcement strap attachment point 34 immediately above the tool handle attachment portion 14 of the extension 12 and an opposite second end 36/38 respectively secured to the first and second ends 22/24 of the crossmember handle 20.

Figure 2:
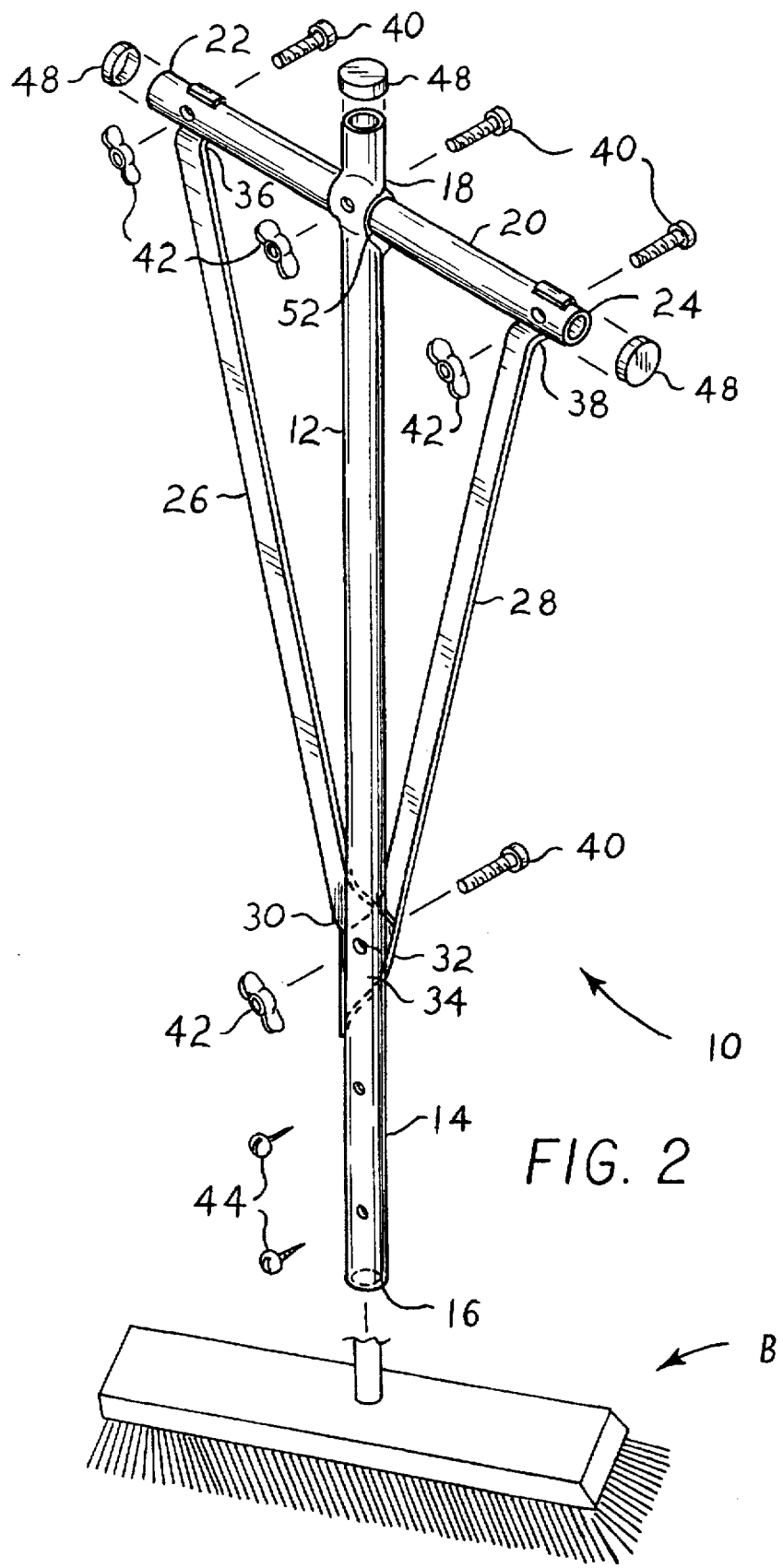
FIG. 2 is an exploded perspective view of the present tool handle extension secured to a push broom, and illustrating details and optional features of the extension.
Figure 3:
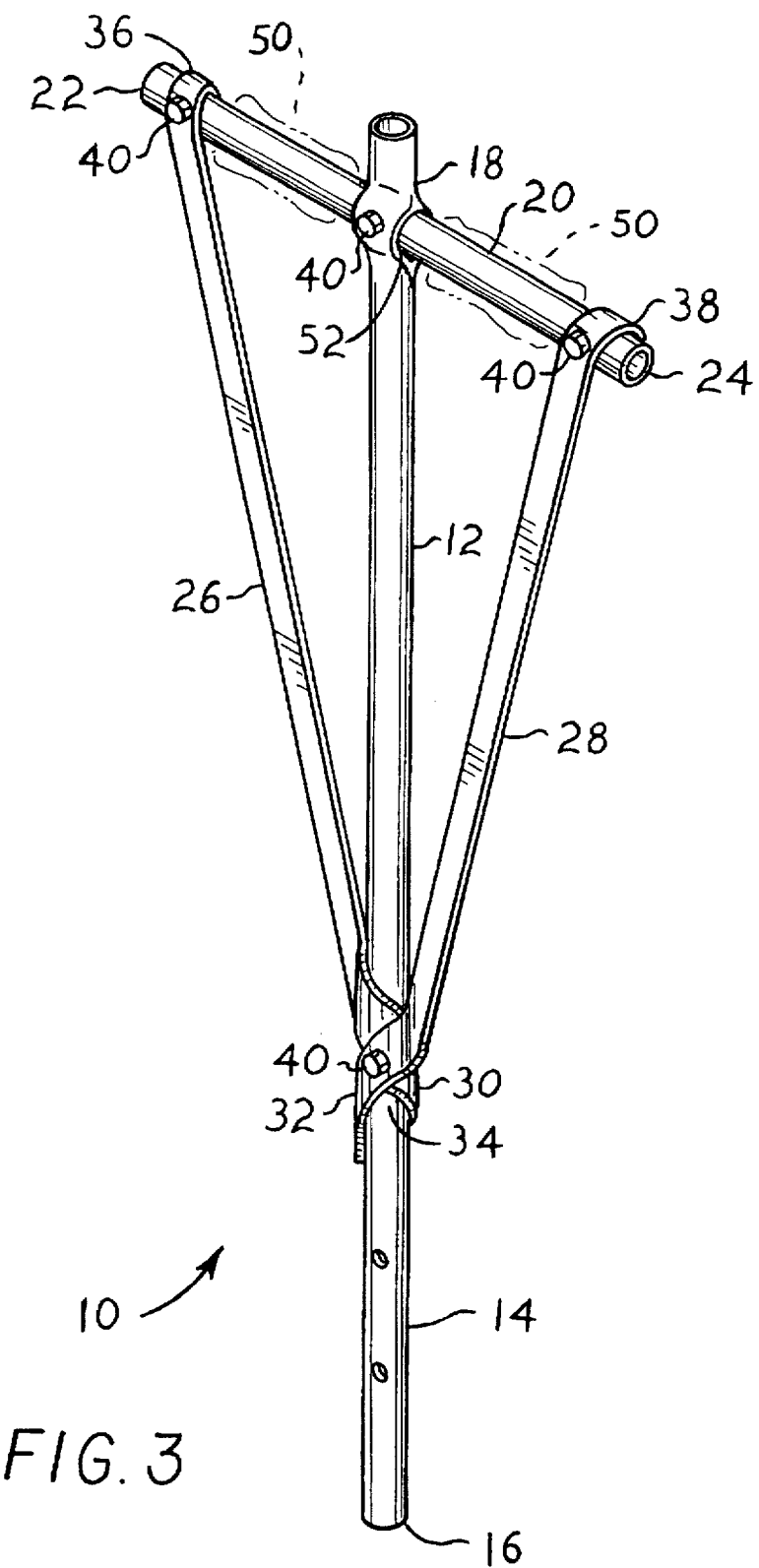
FIG. 3 is a perspective view of the assembled tool handle extension of FIG. 2, disclosing further details.

The ends 30/32/36/38 of the straps 26/28 may be curved to provide a closely conforming fit to the curves of the tubular tool handle attachment member 12 and crossmember handle 20, either behind or under the attachment member 12 and handle 20, as shown in FIG. 2, or in front of or atop the member 12 and handle 20, as shown in the assembled tool handle extension of FIG. 3.

The various components may be secured together by means of machine screws or bolts 40 and cooperating wing nuts 42 at the crossmember handle and reinforcement strap attachment points 22 and 24, at the intersection of the tool handle attachment member 12 and crossmember handle 20, and at the reinforcement strap attachment point 34 of the tool handle attachment member 12. The tool handle attachment portion 14 of the member 12 may be permanently or semi-permanently secured to the elongate handle of a tool, such as the push broom B of FIG. 2, by means of a plurality of wood screws 44 driven into the handle of the tool. Alternatively, through holes may be provided through the handle, as in the various attachments of the tool handle extension 10, with hand actuated fasteners (bolts or machine screws and wing nuts, etc.) being used.

While the use of wing nuts 42 allows the various fasteners 40 to be hand tightened, it is possible that these fasteners may produce sufficient compressive force across the tubular members to distort them, particularly if tools are used to tighten the fasteners. Accordingly, solid inserts 46 (short portions of dowels, etc.) may be installed at the strap attachment point 34 with the tool handle attachment portion 14, at the strap attachment points with the crossmember handle ends 22 and 24, and at the intersection of the crossmember handle 20 and extension handle end 18, as shown in the cross sectional view of FIG. 5. These inserts 46 serve to preclude crushing or distortion of the hollow tubular members used in the construction of the present tool handle extension 10, although they may be omitted if desired, particularly where hand tightening of all fasteners is used.

Further comfort may be provided for the user of the present tool handle extension 10 by capping or covering the exposed ends 18/22/24 of the tool handle attachment member 12 and crossmember handle 20 if desired, as shown in FIG. 2. Prefabricated plastic caps or plugs 48, as provided for covering holes in electrical chassis and for other uses, are available in various diameters to fit virtually any diameter tubing used in the construction of the present extension 10. Another feature which may be desirable is a provision for relatively soft and pliable hand grips 50, as shown in FIG. 3 in broken lines. These grips 50 are available in many bicycle shops and hardware stores, and may be formed of foam or similar material to insulate the hands of the user from the cold aluminum or other metal tubing which may be used in the construction of the crossmember handle 20 and other components of the present tool handle extension 10. The provision of soft, resilient hand grips 50 also provides a better grip for the user, for more effective handling of the tool handle extension 10.

The present tool handle extension 10 provides a solid and secure means of attaching the crossmember handle to the handle end 18 of the tool handle attachment member 12, by forming an eye through one of the tubes of the crossmember handle or handle end, as in the eye 52 through the handle end 18 in FIGS. 2, 3, and 5. If the tube in which the eye is formed is of a larger diameter than the tube passing therethrough, then a simple hole may be cut through the larger diameter tube and the smaller diameter tube inserted therethrough. However, it will be apparent that the diameter of a typical handle H of a tool, such as the shovel S or broom B, is generally on the order of ¾ inch or so. Accordingly, a tool handle attachment member having an internal diameter sized to fit closely about the handle of such a tool, may have an outer diameter on the order of ⅞ inch or so, depending upon the exact diameter of the tool handle H and the wall thickness of the tube. (Larger tool handle attachment member 12 diameters may be used if desired, by providing a sleeve 54 concentric with the tubular member 12 and the handle H, as shown in FIG. 5.)

If a larger diameter crossmember handle 20 is desired, for greater comfort and better grip, then the eye 52 formed in the handle end 18 of the tool handle attachment member 12 must be expanded, as shown in FIGS. 2, 3, and 5, which may produce a tight and secure fit for the crossmember handle 20 fitting therethrough. The use of a bolt or machine screw 40, or other suitable fastener, provides further security to produce a sturdy and solid tool extension 10.

Variations on the eye configuration are shown in FIGS. 4 and 6, where an eye, respectively 56 and 58, is formed in the respective crossmember handle 60 and 62, through which the respective tool handle attachment member handle end 64 and 66 is passed. This configuration is adaptable to tubing members having identical diameters 68, as in the handle ends 64 and crossmember 60 of FIG. 4, or in which the handle crossmember tube 66 through which the eye 58 is formed may have a slightly smaller diameter 70 than the larger diameter 72 of the handle end 64 which passes therethrough, as shown in FIG. 6. (While FIGS. 4 and 6 show the tool handle attachment member handle ends, respectively 64 and 66, passing through the handle crossmembers, respectively 60 and 62, it will be seen that the above described construction may be used in any orientation, with either of the tubular members of either the same or smaller diameter having an eye formed therethrough, through which a tube of equal or larger diameter passes.)

In summary, the present tool handle extension 10 will be seen to provide a most useful accessory for a variety of hand operated tools and utensils having straight, elongate handles, such as snow shovels, push brooms, and other tools having similar configurations. The extension 10 may be secured to the handle end of the tool using screws or other suitable fastening means, with any space between the internal diameter of the tubular handle attachment member and the handle being taken up with an appropriately sized spacer, as required.

The present tool handle extension is particularly well adapted for use in pushing the tool to which it is attached, as the tubular structure and attachment means is well suited to accommodate axial compressive forces. Some lateral force may be applied without damage to the extension, by means of the diagonal bracing provided between the tool attachment member and the ends of the crossmember handle. Thus, the present extension, in combination with a snow shovel or broom, is particularly well suited for clearing snow from a roof from some convenient overlook, such as a dormer window or the like, as shown in FIG. 1. The slope of the roof provides some assistance in removing the snow, with most of the force developed being compressive as the snow is pushed from the roof. The tool and extension may be withdrawn and repositioned easily, as little tensile load is imposed when the tool is drawn toward the user. The diagonal bracing enables the tool to be maneuvered laterally as required, to clear a wider area. In addition, it will be seen that the present extension has a much broader range of use than the clearance of snow from an area of a roof, and may be used in combination with many other tools, such as squeegees for the removal of water, etc., as desired, with further uses limited only by the imagination of the user.

It is to be understood that the present invention is not limited to the sole embodiments described above, but encompasses any and all embodiments within the scope of the following claims.

I claim:

1. A tool handle extension, comprising:

a tool handle attachment member comprising a straight, elongate cylindrical tube having a tool attachment portion and end and an opposite handle end, with said tool attachment portion being adapted to secure to the handle of a tool having a straight, elongate, cylindrical handle, with the tool handle being secured within said tool attachment portion of said tool handle attachment member;

a crossmember handle comprising a straight, elongate cylindrical tube having a first end and an opposite second end, said crossmember handle being permanently affixed to and coplanar with said handle end of said tool handle attachment member and substantially normal thereto, so that said tool handle attachment member and said crossmember handle form an intersection having a substantially T shaped configuration, and;

said tool handle attachment member including a reinforcement strap attachment point immediately adjacent said tool attachment portion thereof, with a first and an opposite second elongate diagonal reinforcement strap each having a first end permanently affixed to said reinforcement strap attachment point of said tool handle attachment member, and an opposite second end permanently affixed to said crossmember handle respectively adjacent said first end and said second end thereof.

2. The tool handle extension according to claim 1, wherein:

said crossmember handle is affixed to said tool handle attachment member by means of an eye formed diametrically through said tool handle attachment member, with said crossmember handle passing through and being secured within said eye of said tool handle attachment member.

3. The tool handle extension according to claim 2, wherein:

said crossmember handle is selected from the group of crossmember handles having diameters equal to and greater than said tool handle attachment member, with said tool handle attachment member being distended at said eye thereof to provide for passage of said crossmember handle therethrough.

4. The tool handle extension according to claim 1, wherein:

said crossmember handle is affixed to said tool handle attachment member by means of an eye formed diametrically through said crossmember handle, with said tool handle attachment member passing through and being secured within said eye of said crossmember handle.

5. The tool handle extension according to claim 4, wherein:

said tool handle attachment member is selected from the group of tool handle attachment members having diameters equal to and greater than said crossmember handle, with said crossmember handle being distended at said eye thereof to provide for passage of said tool handle attachment member therethrough.

6. The tool handle extension according to claim 1, including:

grip means disposed about at least said crossmember handle to each side of said tool handle attachment member.

7. The tool handle extension according to claim 1, including:

cap means installed upon said first end and said second end of said crossmember handle and upon said handle end of said tool handle attachment member.

8. The tool handle extension according to claim 1, including:
   inserts disposed within said tool handle attachment member at said reinforcement attachment point thereof, within said crossmember handle adjacent said first end and said second end thereof, and within said intersection of said tool handle attachment member and said crossmember handle, said inserts precluding crushing of said tool handle attachment member, said crossmember handle, and said intersection when each said reinforcement strap is secured to said reinforcement attachment point of said tool handle attachment member and to said crossmember handle, and said tool handle attachment member and said crossmember handle are secured together at said intersection.

9. The tool handle extension according to claim 1, wherein:
   said first end and said second end of each said reinforcement strap are formed to conform closely respectively to said cylindrical tool handle attachment member and to said cylindrical crossmember handle.

10. A tool and a tool handle extension therefor, comprising in combination:
   a tool having a straight, elongate, cylindrical tool handle, with said handle having a working element attachment end and an opposite handling end;
   a tool handle extension including a tool handle attachment member comprising a straight, elongate cylindrical tube having a tool attachment portion and end and an opposite handle end, with said tool attachment portion being adapted to secure to said handling end of said tool handle, with said handling end of said tool handle being secured within said tool attachment portion of said tool handle attachment member;
   said tool handle extension further including a crossmember handle comprising a straight, elongate cylindrical tube having a first end and an opposite second end, said crossmember handle being permanently affixed to and coplanar with said handle end of said tool handle attachment member and substantially normal thereto, so that said tool handle attachment member and said crossmember handle form an intersection having a substantially T shaped configuration, and;
   said tool handle attachment member of said tool handle extension including a reinforcement strap attachment point immediately adjacent said tool attachment portion thereof, with a first and an opposite second elongate diagonal reinforcement strap each having a first end permanently affixed to said reinforcement strap attachment point of said tool handle attachment member, and an opposite second end permanently affixed to said crossmember handle respectively adjacent said first end and said second end thereof.

11. The tool and tool handle extension combination of claim 10, wherein:
   said tool is a snow pusher type shovel.

12. The tool and tool handle extension combination of claim 10, wherein:
   said tool is a push broom.

13. The tool and tool handle extension combination of claim 10, wherein:
   said crossmember handle of said tool handle extension is affixed to said tool handle attachment member of said tool handle extension by means of an eye formed diametrically through said tool handle attachment member, with said crossmember handle passing through and being secured within said eye of said tool handle attachment member.

14. The tool and tool handle extension combination of claim 13, wherein:
   said crossmember handle of said tool handle extension is selected from the group of crossmember handles having diameters equal to and greater than said tool handle attachment member of said tool handle extension, with said tool handle attachment member being distended at said eye thereof to provide for passage of said crossmember handle therethrough.

15. The tool and tool handle extension combination of claim 10, wherein:
   said crossmember handle of said tool handle extension is affixed to said tool handle attachment member of said tool handle extension by means of an eye formed diametrically through said crossmember handle, with said tool handle attachment member passing through and being secured within said eye of said crossmember handle.

16. The tool and tool handle extension combination of claim 15, wherein:
   said tool handle attachment member of said tool handle extension is selected from the group of tool handle attachment members having diameters equal to and greater than said crossmember handle of said tool handle extension, with said crossmember handle being distended at said eye thereof to provide for passage of said tool handle attachment member therethrough.

17. The tool and tool handle extension combination of claim 10, including:
   grip means disposed about at least said crossmember handle of said tool handle extension to each side of said tool handle attachment member of said tool handle extension.

18. The tool and tool handle extension combination of claim 10, including:
   cap means installed upon said first end and said second end of said crossmember handle of said tool handle extension and upon said handle end of said tool handle attachment member of said tool handle extension.

19. The tool and tool handle extension combination of claim 10, including:
   inserts disposed within said tool handle attachment member of said tool handle extension at said reinforcement attachment point thereof, within said crossmember handle of said tool handle extension adjacent said first end and said second end thereof, and within said intersection of said tool handle attachment member and said crossmember handle, said inserts precluding crushing of said tool handle attachment member and said crossmember handle when each said reinforcement strap is secured to said reinforcement attachment point of said tool handle attachment member and to said crossmember handle, and said tool handle attachment member and said crossmember handle are secured together at said intersection.

20. The tool and tool handle extension combination of claim 10, wherein:
   said first end and said second end of each said reinforcement strap of said tool handle extension are formed to conform closely respectively to said cylindrical tool handle attachment member and to said cylindrical crossmember handle of said tool handle extension.

* * * * *